United States Patent [19]
Jarczynski et al.

[11] Patent Number: 5,633,543
[45] Date of Patent: May 27, 1997

[54] PRESSURE EQUALIZER AND METHOD FOR REVERSE FLOW VENTILATED ARMATURE IN POWER GENERATOR

[75] Inventors: Emil D. Jarczynski, Scotia; Rebecca A. Nold, Clifton Park; William H. Boardman, IV, Burnt Hills, all of N.Y.

[73] Assignee: General Electric Co., Schenectady, N.Y.

[21] Appl. No.: 353,867

[22] Filed: Dec. 12, 1994

[51] Int. Cl.$^6$ ..................................................... H02K 9/00
[52] U.S. Cl. ................................................. 310/59; 310/65
[58] Field of Search ........................... 310/52, 53, 55, 310/57–59, 60 A, 60 R, 64, 65, 254

[56] References Cited

U.S. PATENT DOCUMENTS

| | | | |
|---|---|---|---|
| 831,625 | 9/1906 | McElroy | 310/65 |
| 926,086 | 6/1909 | Behrend | 310/59 |
| 3,508,093 | 4/1970 | Obukhov | 310/65 |
| 4,876,470 | 10/1989 | Geller | 310/59 |

*Primary Examiner*—Mark O. Budd
*Attorney, Agent, or Firm*—Nixon & Vanderhye

[57] ABSTRACT

In a ventilated cooling system for a generator, the cooling ducts in the stator are arranged to control the flow of cooling gases through the stator. The ducts in the stator extend radially and direct cooling gases from the outer periphery of the stator to its inner cylindrical surface. Cooling gases flow radially inward through these stator ducts, extract heat out of the stator and exit from the stator ducts into an annular air gap between the stator and rotor. A fan on the rotor draws the heated air out from the air gap and causes more cooling gas to be drawn into the stator. The cooling ducts in the stator are spaced and sized to optimally distribute the flow of cooling gases through the stator by equalizing the pressure drops between the stator outer plenum and the entrance to the rotor exhaust fans. For example, the stator ducts may be spaced close together at the center of the stator and farther apart near the ends of the stator to provide balanced cooling flows and uniform temperatures. Similarly, the cross-sectional area of the cooling ducts at the center of the stator may be greater than that of the ducts near the ends of the stator. By arranging the spacing and area of the stator ducts along the length of the stator, the volume of cooling gases and the required pressure head are reduced and minimized. In addition, the volume of cooling gases may be directed to those sections of the stator that most require cooling.

22 Claims, 4 Drawing Sheets

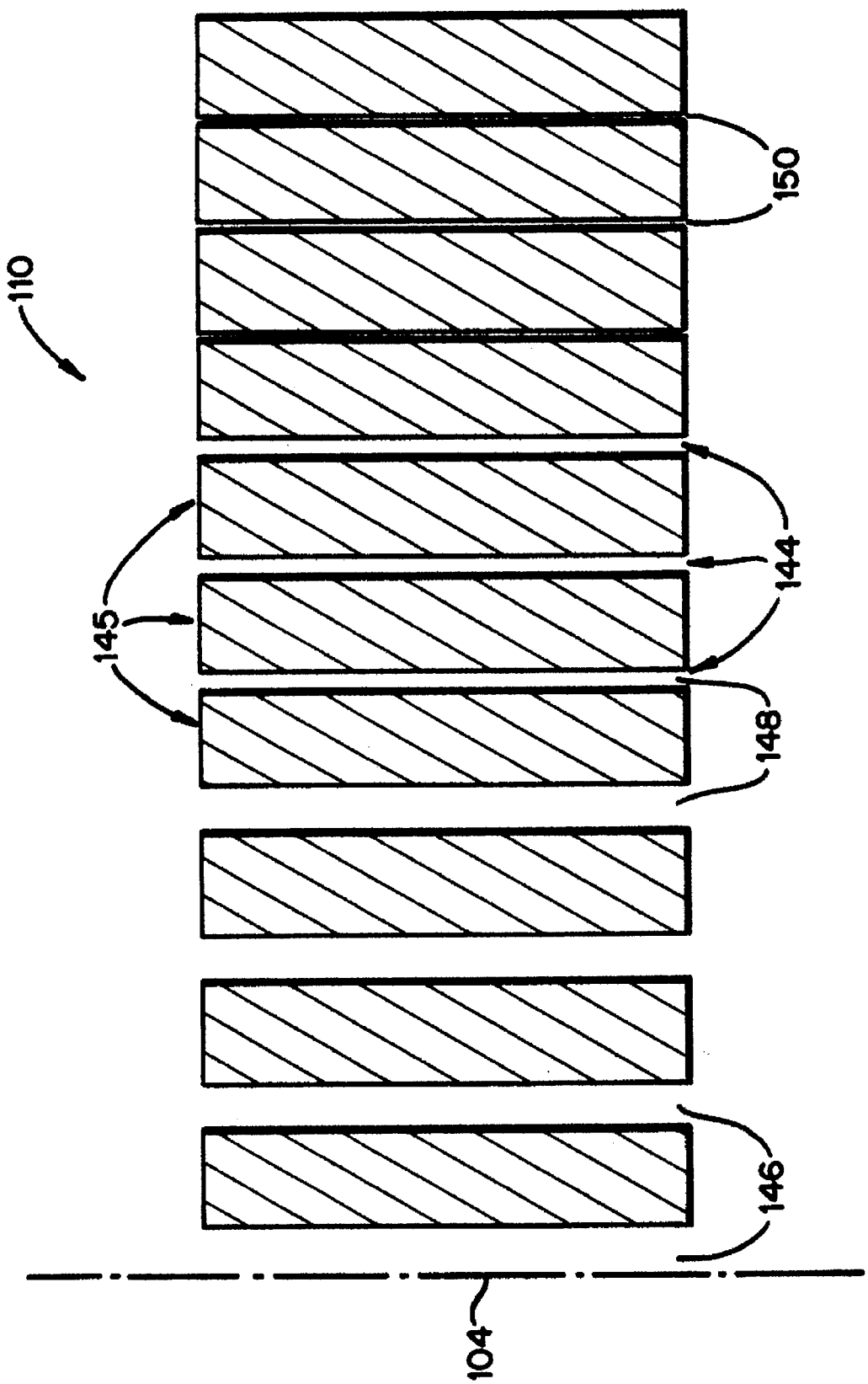

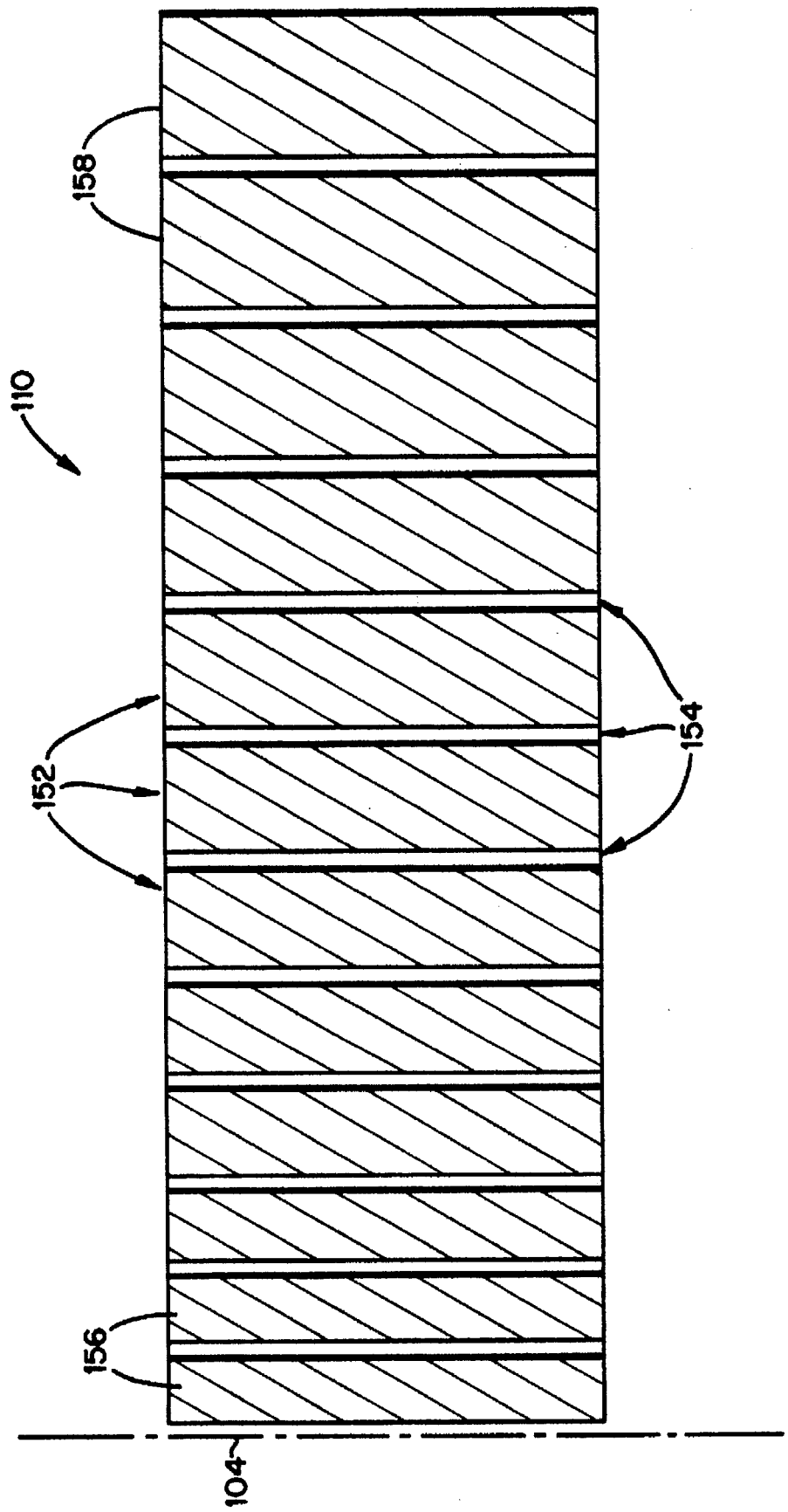

PRESSURE EQUALIZER AND METHOD FOR REVERSE FLOW VENTILATED ARMATURE IN POWER GENERATOR

FIELD OF THE INVENTION

This invention relates to ventilating cooling systems for power generators and, more particularly to reverse-flow ventilators for the armatures of the generators.

BACKGROUND AND SUMMARY OF THE INVENTION

In the process of producing electricity, power generators also create heat that must be dissipated away from the generator. Heat occurs in generators due primarily to friction and current. Frictional heating occurs as the rotor spins at high speed in the generator. Similarly, heating also occurs as current flows through the rotor and stator coils, as these coils rotate relative to one another in the magnetic fields of the generator. Generators are equipped with cooling systems to transfer heat from the stator and rotor out away from the generator.

Generators are traditionally gas-cooled by ventilated cooling systems that circulate air, or other cooling gases, through ducts in the rotor and stator. In this regard, FIG. 1 shows a cross-section of one-half of a generator 4 (see axial center-line 6 and longitudinal center-line 8) having a conventional reverse flow ventilated cooling system 10. A portion of the flow of cooling gases is directed to the rotor 12 where cool gases 14, such as ambient air, are drawn into the rotor body. The cool gases 14 are drawn through ventilation ducts 16, 18 in the rotor by centrifugal forces created by the spinning rotor. As the gases flow through the rotor, heat in the rotor is transferred to the gases as the temperature of the gases rises towards the temperature of the rotor coils 20. The heated rotor gases exit the ducts at the surface of the rotor into an air gap 22 between the rotor and stator 26. Moreover, the rotor may be cooled in many ways, other than the exemplary manner shown in FIG. 1. Spinning fans 28 mounted at the ends of the rotor draw the heated gas through the gap 22 between the stator and rotor. The heated gas 24 is directed by an external duct 29 to a heat exchanger 28 that cools the gas.

The stator 26 is cooled by ventilation flow paths that are separate from the flow paths in the rotor. Cold gas 30 cooled by the heat exchanger 28 enters a plenum chamber 32 surrounding the stator. Because the end sections of the stator are closest to the rotor exhaust fans 28, cooling gas tends naturally to flow in greater volume and velocity through the ducts near the ends of the stator than through ducts at the center of the stator. This potential unbalance in the flow of cooling gas through the stator has traditionally been compensated for by baffle chambers 34 that extend around outer surface of the stator. The baffle chambers are arranged to distribute cooling gas uniformly along the length of the stator such that the flow of gas to the center section 36 of the stator is substantially equal to the flow of gas to stator ends 38. The baffle chambers impose additional flow restrictions and pressure drops on the cooling gas entering the end sections of the stator which cause some cooling gas that would naturally flow to the ends of the stator to flow to the center of the stator. However, the pressure drops in the cooling gas caused by the baffle chambers reduce the gas pressure available to move the cooling gas through the ventilation ducts of the stator.

The cooled gas 30 pass through the baffle chambers (or directly to the stator near the center of the stator) and into cooling gas intake ducts 40 in the outer circumferential surface 42 of the stator 26. In conventional reverse flow systems, the stator ducts 40 are uniform in cross-sectional area, length and spacing (frequency). As the gas flows radially inward through the stator, heat from the stator coils 44 is transferred to the gas. The rotor fans 28 draw the warmed gas from the stator, into the air gap 22 and out to the external duct 29 to the heat exchanger 28. A portion of the cooled gas 30 from the heat exchanger is exhausted from exhaust ports 46 in the ends of the plenum chamber 32 around the stator to cool the stator end turns 48.

Relatively high ventilation pressure heads are needed to pump cooling air through the baffle chambers 34 and stator ducts 40 of current large power generators. As the power generator ratings and sizes increase, the requirement for higher ventilation pressure heads for cooling gas increases as well. Some of the pressure head of the cooling gas is dissipated by the baffle chambers and, thus, the pressure head must be increased to compensate for the loss in the baffles. One solution to this difficulty is to use other types of cooling gases, e.g., hydrogen gas, that have a higher cooling capacity than ambient air. However, these other types of gases require special seals, purging systems and diagnostic instruments that are complex and expensive.

Air is a simple to use and cheap cooling gas, that does not require complex systems to handle. Unfortunately, air has a relatively low cooling capacity. To compensate for the low cooling capacity of air, the volume of air flow through the stator has been progressively increased with better rotor fans that provided high pressure heads to the cooling gases. Pressure heads could be further increased with multi-stage fans, but power consumption increases. As a result, overall efficiency decreases, and costs and complexity would increase. In addition, the baffles used to direct the flow of cooling gases toward the center of the stator deflect the flow of the gases and, thus, have the undesirable effect of reducing the pressure of the gases. Accordingly, there is a long-felt need to increase the efficiency of air cooled, reverse flow generators.

The current invention is a reverse flow, ventilated cooling system for a generator in which the cooling ducts in the stator are arranged to provide optimal flow of cooling gases through the stator. For example, the spacing and cross-sectional area of stator cooling ducts are varied along the length of the stator to optimize the distribution of cooling gases through the stator and minimize the necessary pressure head needed for the cooling gases. It is an object of the invention to provide a reverse cooling system having reduced pressure head requirements at the stator duct intakes. Another object of this invention is to provide cooling ducts in stators having reduced pressure drops through the stator ducts. A further object of the invention is to provide stator cooling ducts arranged such that the maximum pressure drop of the cooling gases, and hence maximum gas velocity, occurs in the areas of the stator that most require cooling. Moreover, another object of the invention is to provide stator cooling ducts that intensify the cooling action in the sections of the stator that most require cooling.

DESCRIPTION OF THE FIGURES

These features and objectives of the invention, as well as others, will become more apparent from the detailed description of the preferred embodiment of the invention and accompanying figures of that embodiment.

FIGS. 3 and 4 are schematic cross-sectional diagrams of a stator showing certain features of various embodiments of the invention.

DETAILED DESCRIPTION OF THE DRAWINGS

Figure 2:
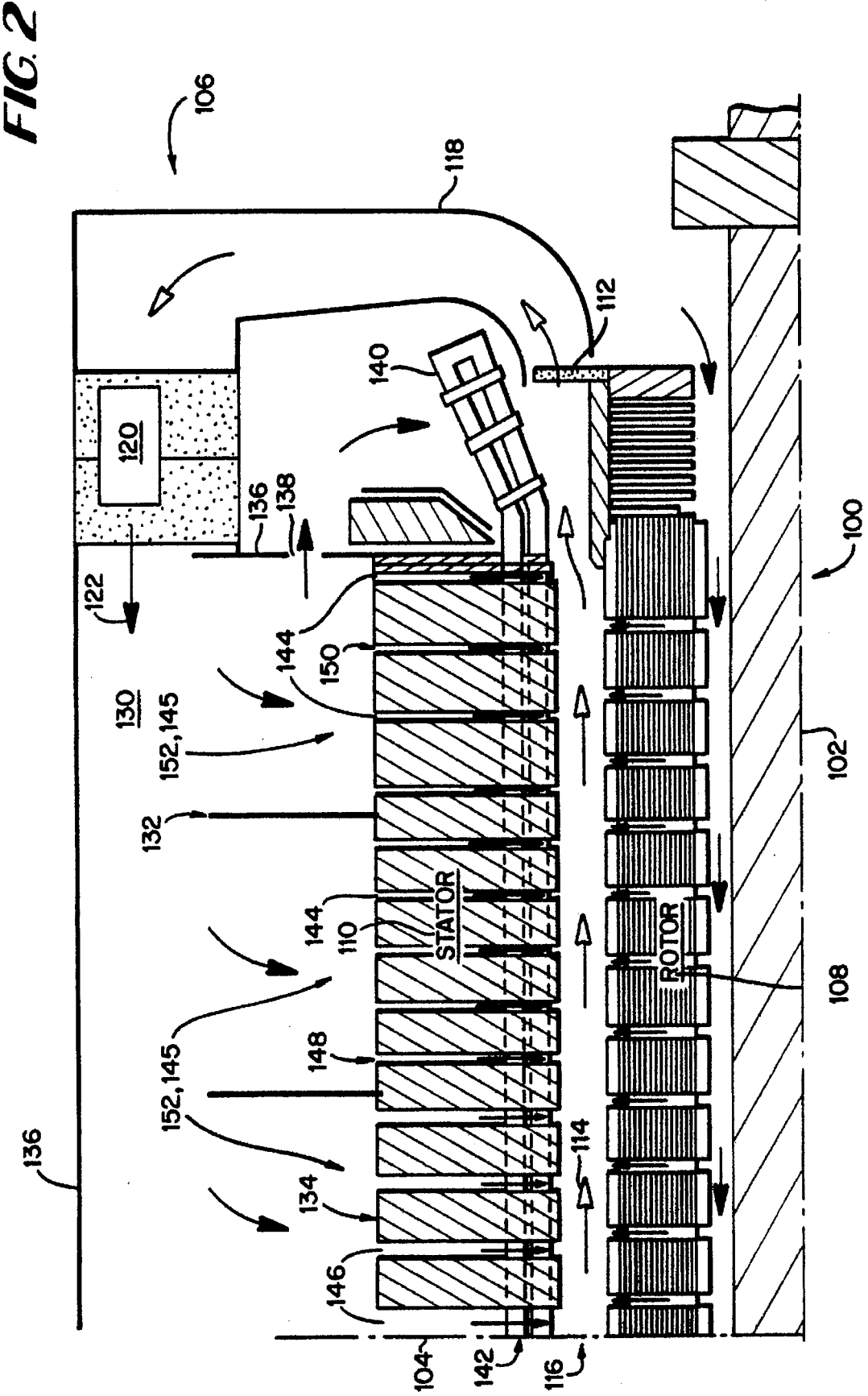
FIG. 2 is a schematic cross-sectional diagram of a generator showing a reverse-flow cooling system in accordance with one embodiment of the present invention.

FIG. 2 shows a cross-section of one-half of a generator 100 (see axial center-line 102 and longitudinal center-line 104) having a reverse flow, ventilated cooling system 106. The generator includes a rotary rotor 108 and a stationary stator 110. A cooling gas fan 112 is affixed to the end of the rotor. The fan spins with the rotor to draw heated air 114 out from an air gap 116 between the rotor 108 and stator 110, and pump the warmed air into external gas ducts 118 that extend around the generator.

The external gas duct 118 directs the warmed gas to a heat exchanger 120 associated with the generator. The heat exchanger extracts heat imparted to the gas by the stator 110 and rotor 108, and cools the gas. Cooled gas 122 from the heat exchanger enters a plenum chamber 130 surrounding the stator. The plenum chamber may include annular walls 132 attached to the stator that direct cooled gas to the outer circumference 134 of the stator 110 and confine cooling gas to certain sections of the stator. The outer walls 136 of the plenum chamber may also include an exhaust port 138 that bleeds cooling air from the chamber to the end of the stator and over the end-turns 140 of the stator coils 142.

As shown in FIGS. 2 and 3, the cooling ducts 144 between the stator core packets 145 in the stator 110 are arranged such that the widest ducts 146, i.e., those with the largest cross-sectional area, are grouped near the center 104 of the stator. This minimizes the duct pressure drop in the center stator section and compensates for the pressure drop along the long axial length of the air gap 114 between the stator and rotor. In contrast, prior art stator ducts have uniform cross-sections along the length of the stator. By varying the cross-sectional area of the stator ducts along the length of the stator, the distribution of the cooling gas flow may be optimized for the stator. For example, a hot section of the stator can be cooled with a large volume of cooling gas by providing wide stator ducts in the hot stator section or with added surface area and high velocity gas by using multiple narrow stator ducts.

The stator ducts 148 outward from the stator center may be progressively narrower than the center ducts 146, and the ducts 150 near the ends of the stator may be the narrowest ducts in the stator. Accordingly, the cooling ducts in the stator may become progressively narrower and hence have smaller cross-sectional flow areas as they approach the outer ends of the stator. By arranging the cooling ducts in the stator such that the wider ducts with larger passageways are near the center of the stator, the pressure drop between the stator outer plenum 130 and the entrance to the rotor exhaust fans 112 is equalized along the axial length of the stator.

Figure 1:
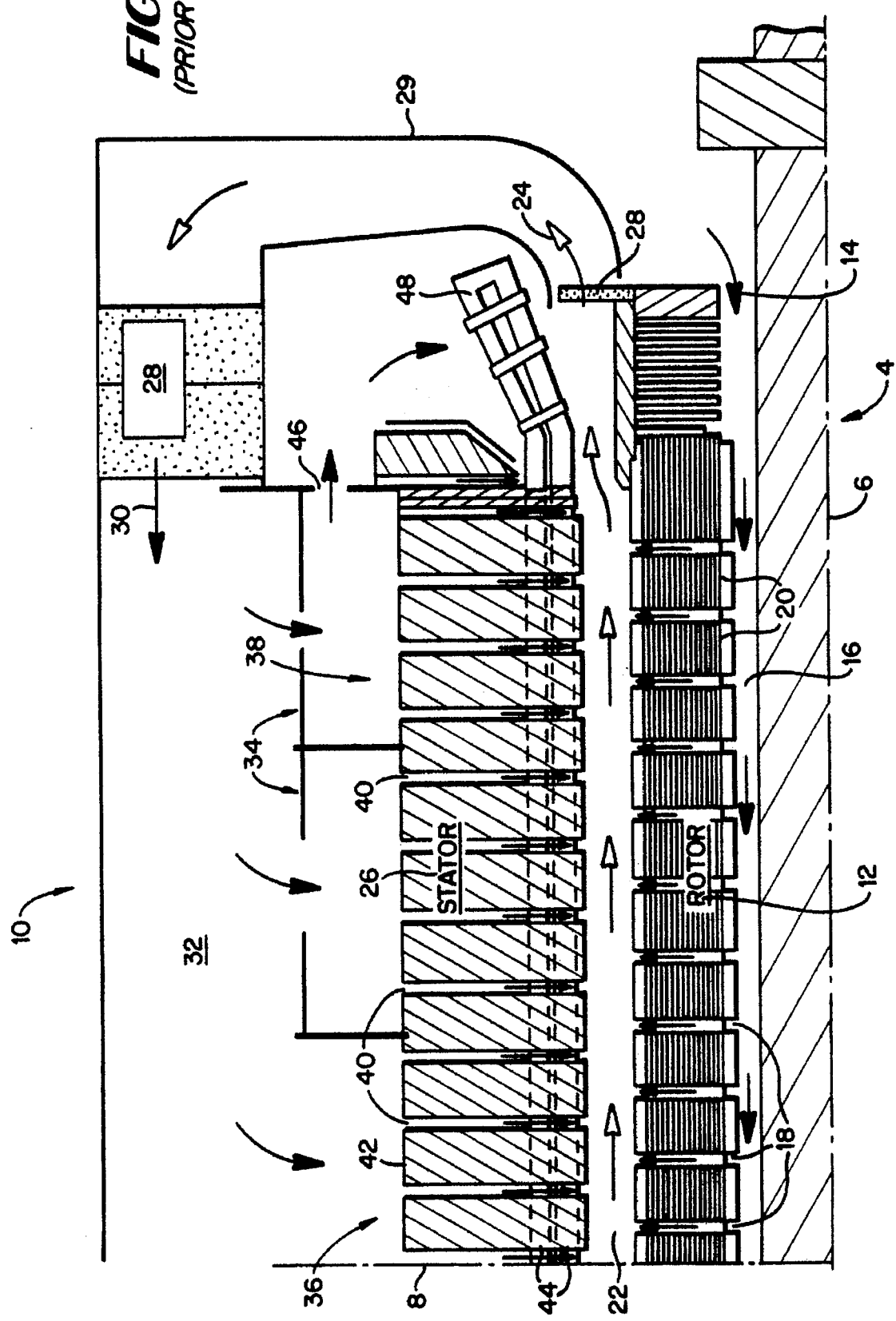
FIG. 1 is a schematic cross-sectional diagram of a generator showing a conventional reverse-flow cooling system in accordance with prior art practices.

In addition (or alternatively), the spacing of the stator ducts between the stator core packets 152 may be non-uniform to optimize the distribution of cooling gases through the stator, as is shown in FIGS. 2 and 4. In FIG. 4, the stator ducts 154 have uniform cross-sectional areas, but the spacing (frequency) between each duct varies along the length of the stator. This is in contrast to the stator shown in FIG. 3 where the duct areas vary, but the spacing between packets 145 is uniform. Stator core packets are traditionally all of a uniform length (see FIG. 1) and the stator ducts that are formed between the core packets are uniformly distributed along the length of the stator.

In embodiments of the invention shown in FIGS. 2 and 4, the stator core packets 152 are not all of a uniform length and, for example, the packets 156 at the center 104 of the stator are shorter than the packets 158 at the ends of the stator. The packets between the center and end of the core are progressively longer, i.e., each packet increases in length as the packets progress from the center to the ends of the stator. Because the packets are shortest at the center of the stator, the frequency (spacing between ducts) of the stator ducts between these packets is greater at the center of the stator than at the ends of the stator. The greater frequency of ducts at the center of the stator results in a decreased pressure drop of cooling gases through the center of the stator than at the ends of the stator, and compensates for the added pressure drop along the long axial length of the air gap 116.

Moreover, the frequency of the stator ducts can be optimized depending of the particular generator in which these ducts are to be arranged. For example, the highest frequency of stator ducts (and/or ducts with the largest cross-section area) may be located at a far end of a stator away from a cooling gas inlet, in a generator having an inlet or outlet at just one end rather than at both generator ends as is conventional. Accordingly, a generator may have specific cooling requirements that necessitate directing a greater volume of cooling gases to an area of the stator (other than the center of the stator). This requirement can be met by increasing the frequency of the cooling gas ducts and/or the cross-section area of the ducts at the area of the stator requiring the greatest amount of cooling. In this regard, the spacing of the cooling gas ducts may be varied while the cross-sectional area of the ducts is constant, as is shown in FIG. 4. Similarly, the cross-sectional area of the ducts may be varied while the spacing between ducts is constant, as is shown in FIG. 3. In addition, both the cross-sectional area of and spacing between the ducts may be varied as is shown in FIG. 2.

Increasing the frequency and/or cross-sectional area of certain stator ducts equalizes the flow distribution without reducing the pressure head of the cooling gas entering the stator as happens with the use of prior art baffle chambers around sections of the stator. Instead, the pressure head may be used directly to force cooling gas equally through the stator heat generating sections. In some instances, it may be desirable to combine the use of baffle chambers with variations in the frequency and/or cross-sectional area of some stator duct to achieve a desired distribution of cooling gas flow through the stator.

The invention has been described in its preferred embodiment. The invention is not to be limited to the disclosed embodiments, but covers the various modifications and equivalent arrangements included within the spirit and scope of the appended claims.

What is claimed is:

1. An electromagnetic generator comprising:
    a stator concentric to a rotor having stator core packets annularly arranged around the rotor, and radial stator ducts sandwiched between the stator core packets, each of the stator ducts extending radially inward from an outer stator surface to an inner stator surface proximate to the rotor,
    wherein each stator duct has a cross-sectional duct area, and a distribution of cross-sectional duct areas for the ducts is substantially non-uniform across the length of the stator, and each duct has an duct inlet at the outer stator surface and a duct outlet at the inner stator surface, and a cooling gas circulation flow wherein cooling gas enters the duct inlets at the outer stator surface, flows through the ducts to extract heat from the stator core packets, exits the duct outlets at the inner stator surface, passes through a gap between the inner stator surface and the rotor, and a cooling gas flow resistance between the inlet to each duct and a gas outlet from the gap is substantially uniform for all ducts.

2. An electromagnetic generator as in claim 1 wherein the cross-sectional duct area for certain stator ducts is greater that the cross-section duct area for other stator ducts.

3. An electromagnetic generator as in claim 2 wherein the cross-section duct area for a duct in a center section of the stator is substantially greater than the cross-sectional duct area for a stator duct in an end section of the stator.

4. An electromagnetic generator as in claim 2 wherein the cross-sectional duct area for stator ducts increases progressively from a first section of the stator to a second section of the stator.

5. An electromagnetic generator as in claim 4 wherein the first section of the stator is a center section of the stator and the second section of the stator is an end of the stator.

6. An electromagnetic generator as in claim 1 wherein the stator ducts are distributed along the stator at a predetermined frequency of ducts and the frequency of ducts is non-uniform along the length of the stator.

7. An electromagnetic generator as in claim 1 wherein the stator ducts are distributed along the stator at a predetermined frequency of ducts and the predetermined frequency of ducts increases progressively along the stator.

8. An electromagnetic generator as in claim 1 wherein the stator ducts are located more frequently in a center section of the stator than at an end section of the stator.

9. An electromagnetic generator as in claim 2 wherein the stator ducts are distributed along the stator at a predetermined frequency of ducts and the frequency of ducts is non-uniform along the length of the stator.

10. An electromagnetic generator comprising:

a rotating cylindrical rotor having an outer peripheral surface;

a fan mounted on an axial end section of the rotor and aligned with an annular gas gap adjacent the outer peripheral surface of the rotor, wherein said fan draws cooling gas from the annular gap;

an annular stator concentric to the rotor having stator core packets annularly arranged around the rotor and having an annular inner surface adjacent the gas gap, and radial stator ducts sandwiched between the stator core packets and open from the inner surface of the stator to an outer peripheral surface of the stator, wherein each duct has a cross-sectional duct area and a distribution of cross-sectional duct areas for the ducts is substantially non-uniform across the stator, and further said ducts include cooling gas inlets at the outer peripheral surface of the stator, and cooling gas outlets at the annular inner surface, wherein cooling gas enters the inlets, flows through the ducts and exits the outlets into the annular gap;

a cooling gas plenum located radially outward of the stator open to the radial stator ducts, wherein the cooling gas enters an inlet to the plenum and flows through the plenum into the inlets of the cooling gas ducts;

a heat exchanger having an exhaust outlet coupled to the inlet to the cooling gas plenum, wherein the cooling gas enters an inlet to the heat exchanger, through the heat exchanger, exits the exhaust outlet, and flows into the plenum; and a cooling gas conduit coupled to the inlet of the heat exchanger at a first end and open to the annular gas gap at a second end, such that the cooling gas is moved by the fan from the annular gap between the stator and rotor, and a cooling gas flow resistance between each inlet to the ducts and the second end of the conduit is substantially uniform for all ducts.

11. An electromagnetic generator as in claim 10 wherein the cross-sectional duct area for a first stator duct is substantially greater that the cross-section duct area for a second stator duct.

12. An electromagnetic generator as in claim 11 wherein the first stator duct is located in a center section of the stator and the second stator duct is in an end section of the stator.

13. An electromagnetic generator as in claim 10 wherein the cross-sectional duct area for each of the stator ducts between the first and second ducts increases progressively.

14. An electromagnetic generator as in claim 10 wherein the stator ducts are distributed along the stator at a predetermined frequency of ducts and the predetermined frequency of ducts is non-uniform along the stator.

15. An electromagnetic generator as in claim 14 wherein the predetermined frequency of ducts increases progressively in a first direction along the stator.

16. An electromagnetic generator as in claim 10 wherein the stator ducts are located more frequently in a center section of the stator than at an end section of the stator.

17. An electromagnetic generator as in claim 11 wherein the stator ducts are distributed along the stator at a predetermined frequency of ducts and the frequency of ducts is non-uniform along the length of the stator.

18. An electromagnetic generator comprising:

a rotating cylindrical rotor having an outer peripheral surface;

a fan mounted on an axial end section of the rotor and aligned with an annular gas gap adjacent the outer peripheral surface of the rotor, and said gas gap includes a gas exhaust upstream of the fan;

an annular stator concentric to the rotor having stator core packets annularly arranged around the rotor and having an annular inner surface adjacent the gas gap, and radial stator ducts sandwiched between the stator core packets and open from the inner surface of the stator to an outer peripheral surface of the stator, wherein each duct has a cross-sectional duct area and a distribution of cross-sectional duct areas for the ducts is substantially non-uniform across the stator, wherein the cross-sectional duct area for a first stator duct is substantially greater that the cross-section duct area for a second stator duct, wherein the stator ducts are distributed along the stator at a predetermined frequency of ducts and the predetermined frequency of ducts is non-uniform along the stator, and cooling gas inlets to the ducts are at the outer peripheral surface of the stator, and cooling gas outlets to the ducts are at the annular inner surface, wherein a cooling gas flow resistance between the inlet to each duct and the gas exhaust from the gap is substantially uniform for all ducts;

a cooling gas plenum located radially outward of the stator open to the radial stator ducts;

a heat exchanger having an exhaust outlet coupled to an inlet to the cooling gas plenum; and a cooling gas conduit coupled to an inlet of the heat exchanger at a first end and open to the annular gas gap at a second end.

19. An electromagnetic generator as in claim 18 wherein the first stator duct is located in a center section of the stator and the second stator duct is in an end section of the stator.

20. An electromagnetic generator as in claim 18 wherein the cross-sectional duct area for each of the stator ducts between the first and second ducts increases progressively.

21. An electromagnetic generator as in claim 18 wherein the predetermined frequency of ducts increases progressively along the stator.

22. An electromagnetic generator as in claim 18 wherein the stator ducts are located more frequently in a center section of the stator than at an end section of the stator.

* * * * *